Figure 1:
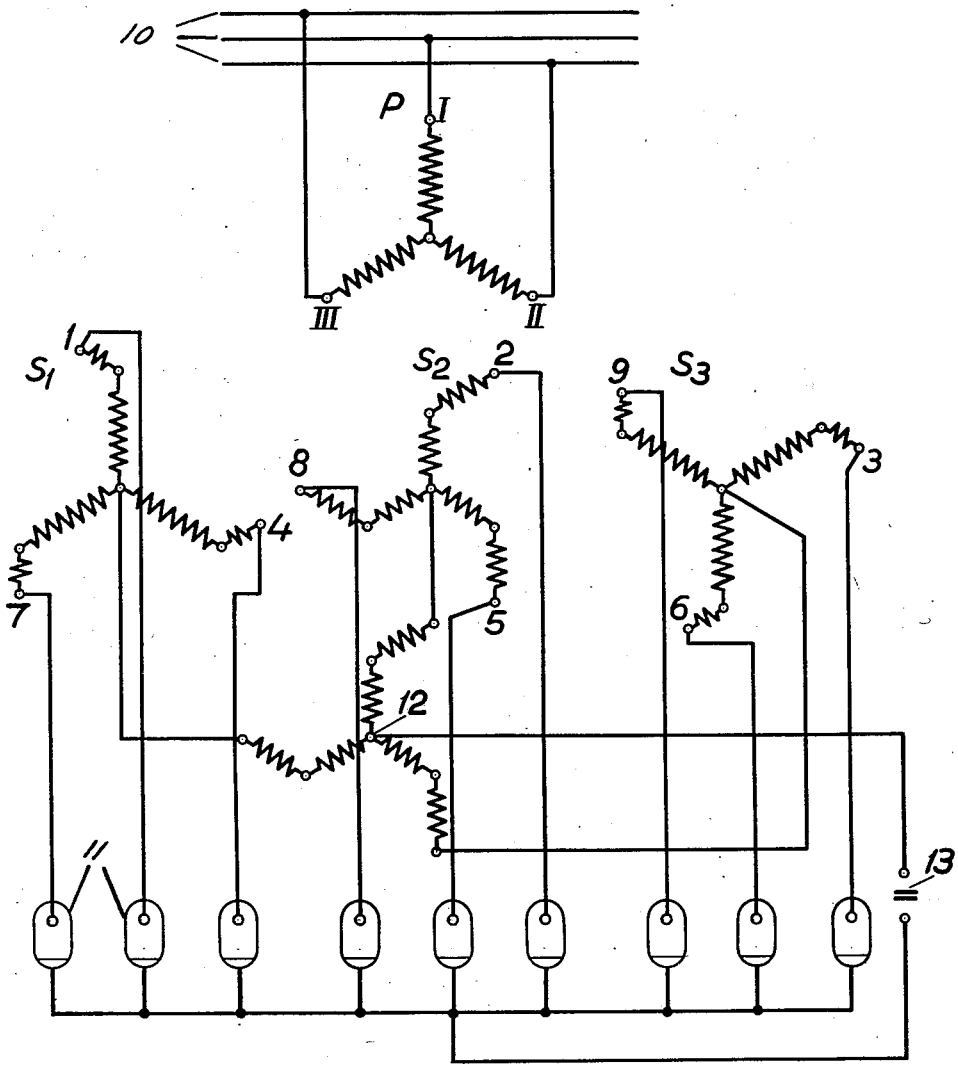

March 24, 1953  E. UHLMANN  2,632,878
POLYPHASE TRANSFORMER FOR CURRENT CONVERTERS
Filed Aug. 21, 1947  2 SHEETS—SHEET 2

Inventor
Erich Uhlmann
By (signature)
Attorney.

Patented Mar. 24, 1953

2,632,878

UNITED STATES PATENT OFFICE 2,632,878

POLYPHASE TRANSFORMER FOR CURRENT CONVERTERS

Erich Uhlmann, Ludvika, Sweden, assignor to Allmänna Svenska Elektriska Aktiebolaget, Vasteras, Sweden, a Swedish corporation Application August 21, 1947, Serial No. 769,888
In Sweden May 6, 1942

Section 1, Public Law 690, August 8, 1946
Patent expires May 6, 1962

5 Claims. (Cl. 321—57)

For using in static current converters (rectifiers, inverters or frequency changers), higher numbers of phases of the direct current than 6, especially phase numbers between 6 and 12, it is possible to employ a converter transformer having two or more different secondary windings, the circuits of which are connected in parallel on the direct current side through interphase transformers or individual reactors so as to commutate independently, i. e. with a number of commutations per cycle corresponding to the number of terminals of the winding connected to valve paths. In a nine-phase converter, the said number is preferably 3. In one-way connected converters, the different secondary windings are generally zigzag connected with varying proportions between the two winding components or different phase angles between these, or both. With such a difference between windings feeding different valve paths, it has been found, however, that an uneven load distribution between the different secondary windings and/or their valve paths may arise by voltages induced by mutual inductance during the periods of commutation in the windings which do not commutate but carry current. The present invention comprises such a mutual arrangement of the different winding components, that the voltages induced in the aforesaid way become pure alternating current voltages and thus may be balanced against each other by interphase transformers or reactors, in which case they do not cause any uneven distribution of load.

It has been heretofore observed that the difference between the separate secondary windings gives measurable results, if on an examination of the transformer all the secondary windings are short-circuited and the currents in the different phases are measured at an impressed symmetrical primary voltage. If no special precautions are taken, different numerical values of the short-circuit currents in the different secondary phases, or different mutual phase angles from the calculated ones, or both, are generally obtained. By a certain mutual arrangement of the windings of the transformer, whereby their proper and mutual inductances can be influenced, it has however been possible to restore the symmetry in such manner that the short-circuit currents measured at an omnipolar secondary short-circuit have obtained equal numerical values and equal phase angles. With such an arrangement of the windings, it has also been possible in an earlier known case, namely in a twelve phase converter having four three-phase secondary windings, to obtain a uniform current distribution on loading, and it has therefore been assumed that the aforesaid rule for checking the inductances of the windings has been sufficient.

Further investigations now performed have, however, proved it to depend on a pure incident that a current converter, the winding inductances of the transformer of which have been mutually dimensioned according to the aforesaid rule, has operated satisfactorily on loading in the aforesaid case. In the general case, it has been found necessary to measure the short-circuit currents determining the commutation in an entirely different manner, namely, by short-circuiting the three terminals of the line side, introducing a single phase current between two terminals on the valve side and measuring the voltage drop then occurring between each pair of terminals separately. As a matter of fact, when using the previously known method for measuring the inductances, all the mutual inductances between the winding components of the transformer influence the measured value, while for practical operation only the mutual inductances are of importance which exist between windings connected to simultaneously active valve paths. In the case of a 4x3 phase current converter referred to, the measurements performed in one way or the other give congruent results, but this is not the case generally. The first condition for a satisfactory operation is in the general case, that the measuring prescribed for this case gives the same short-circuit reactance in all phases. This is however not sufficient, but still another condition arises, the nature of which is evident from the following detailed description with reference to the accompanying drawings.

Figure 2:
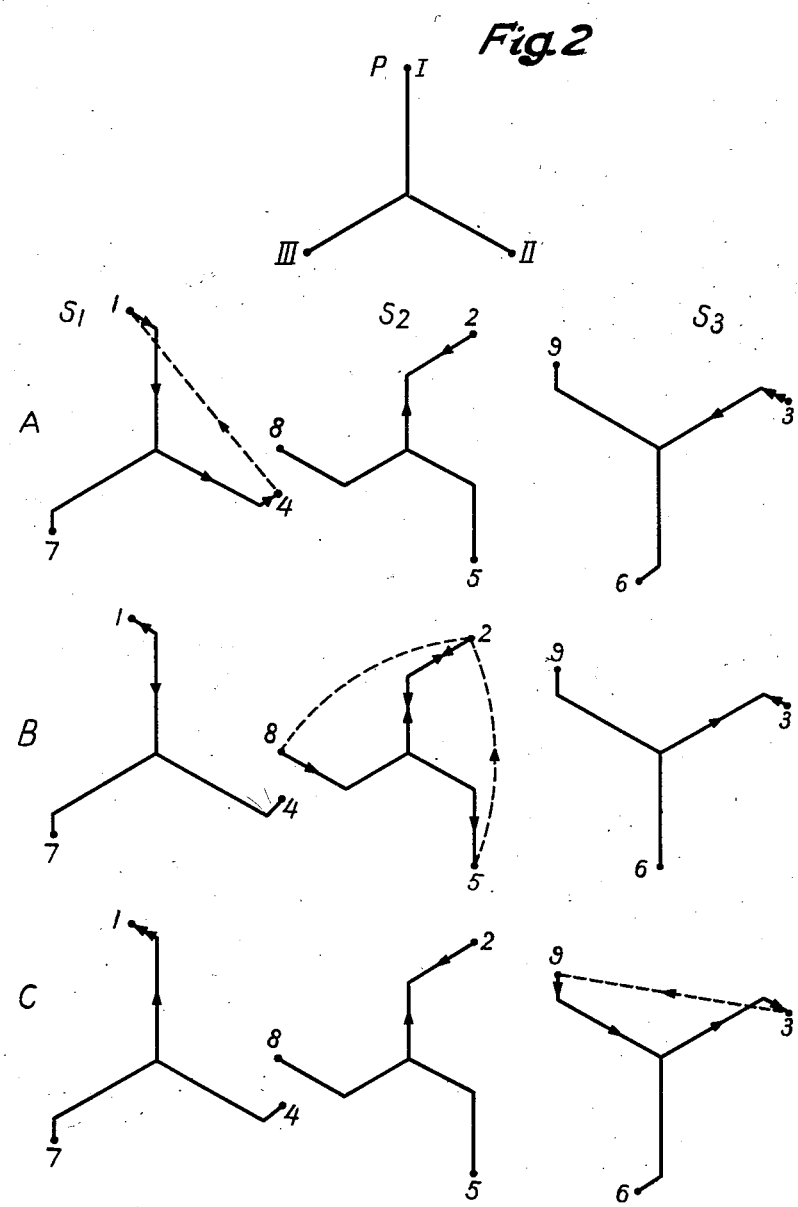

In the drawings:

Fig. 1 is a diagram of a transformer embodying the invention, the direction of the windings of Fig. 1 representing also the vectorial voltage; and Fig. 2 is a voltage and current diagram of the transformer of Fig. 1.

In the drawings, P designates the star-connected primary winding of the transformer having the phases I, II and III, connected in the three phase circuit 10, and $S_1$, $S_2$ and $S_3$ its three secondary windings, which are zig-zag connected. The terminals of the secondary windings, which are connected to valve paths containing valves 11, are designated by 1—9. The lengths of the zigzag connected winding components are so chosen that between each terminal and that succeeding in the phase or number sequence there is a phase difference of 40°. As an example the case is shown, that the terminals 1, 4 and 7 of the winding $S_1$ are 10° in advance of the primary phases, the terminals 2, 5, 8 of the winding $S_2$ 30° in retard and the terminals 3, 6, 9 of the winding $S_3$ 70° in retard of the primary phases. This connection has been found to be especially favourable in several respects, but of course other connections with a mutual phase difference of 40° may be chosen for a 9 phase converter. The neutral points of the three secondary windings are connected through an interphase transformer 12 to the load 13 in such a manner that each valve path is active during the third part of a cycle. The commutation within each of the three-phase secondary windings takes place from each phase to that succeeding it in the clockwise direction, for example from 1 to 4, from 4 to 7 and from 7 to 1.

The secondary windings are, in Figure 2, represented by three partial figures, designated as A, B, and C, for illustrating more clearly the different courses of commutation. As known, each commutation, in the connection referred to, means that a valve path takes the current from the preceding valve path in the phase sequence of the same three-phase star. For instance, the valve path connected to the terminal 4 takes over the current from that connected to the terminal 1. This relieving, however, does not take place instantaneously, but takes a certain time, during which the current in the relieved anode successively rises from zero to its full value. Schematically, the procedure may be regarded in such a manner that in a circuit comprising the two valve paths and winding phases a short-circuit current arises superposed on the normal load current, opposing said load current in the relieved valve path and flowing in the direction of said load current in the relieving valve path. This short-circuit current is forced by the successively rising voltage difference between the two terminals against the reactance of the circuit. When it reaches the value of the load current, it ceases rapidly, as the current in a valve path cannot pass in the rearward direction.

The commutation between the two terminals 1 and 4 has been illustrated in the partial figure A, in which a dotted line between the terminals represents the short-circuit path through the valves. The current direction in said path and in the winding parts is represented by arrows. As seen, the current flows out from the terminal 4 and enters through the terminal 1, when the valve path of the former takes over the current from that of the latter.

By the short-circuit current, which is seen to traverse winding parts on all the legs of the transformer, voltages are induced in all the remaining transformer windings in dependence of the mutual inductance between said windings and those traversed by the short-circuit current. Only those voltages are, however, of importance which are induced in windings which are at the time carrying current. At the commutation between 1 and 4, only the further terminals 2 and 3 carry current. In the windings connected to these terminals, voltages are therefore induced which oppose the short-circuit current and are represented by the arrows following the windings.

In the partial figure B, two commutations are indicated, namely, from 2 to 5 and from 8 to 2. During the first-named commutation, the terminals 3 and 4 carry current, during the last-named one the terminals 9 and 1. The induced voltages are, however, only represented for the terminals 3 and 1, as it is sufficient to limit the whole investigation to the terminals 1, 2, 3. For reasons of symmetry, equal results are then obtained for the two remaining groups of three terminals each.

Finally, the partial figure C illustrates the commutation from 9 to 3 with the voltages caused thereby in the winding parts connected to 1 and 2.

Each leg of the transformer carries, as shown in the drawing, with the primary winding two long, two medium and two short secondary windings. In the short winding part close to the terminal 1, for instance, only outwardly directed voltages are induced, while in the long winding part connected thereto an inwardly directed voltage is induced at the commutation from 7 to 2 and an outwardly directed one at the commutation from 9 to 3. The algebraic sum of all these voltages should be zero at a symmetrical current load in order that the converter shall operate in a satisfactory manner. The same condition holds good for the terminals 2 and 3. The possibilities available for satisfying these conditions are placing of the separate winding components in different manners side by side.

In practice, pairs of windings of equal length (number of turns) are often combined to composite coils with their winding turns intermixed, which generally can be done without inconvenience in spite of the considerable mutual potential difference. The mutual leakage between winding components mixed in this manner can be neglected for purposes of calculation. On the other hand, it may be desirable or necessary, in order to accomplish the desired mutual inductance and/or short-circuit reactance of such a winding component, to divide a composite coil of this kind into two, each containing both winding components, said two coils being mounted on either side of a coil containing two other winding components. For instance, the coil containing the two longest winding components may be divided into two mounted on either side of the coil containing the medium components. The coil containing the shortest winding components may in some cases, for avoiding an extreme thinness, be mounted on one or more separate smaller transformer cores having separate primary windings (preferably mounted in the same vessel as the main transformer). This is especially favourable for the reason that it affords a possibility of adjusting, in a ready-made transformer, the total reactance of the components by connecting primary or secondary reactances in series with the small transformers.

The exact satisfying of the reactance conditions can be checked by measuring, which carried out thus: the three terminals of the primary winding are short-circuited, and an alternating voltage is impressed between, for instance, the terminals 1 and 4 and an equal alternating voltage between 9 and 3 or a voltage on both pairs of terminals in series. The alternating voltage measured between the terminal 9 and the neutral point should then be 0. In a similar manner, voltages are impressed between 2 and 5 and between 1 and 4, and the voltage between the neutral point and 3 is measured etc. All the voltages thus measured should be 0.

In this specification and in the following claims, wherever the length of a winding portion is spoken of, this in reality means the voltage induced in said winding portion by a normal flux variation in the core, in the manner conventional in drawing and explaining transformer diagrams.

I claim as my invention:

1. A nine-phase current converter transformer having three different zig-zag connected secondary windings and an interphase transformer connecting the neutral points of said secondary windings, said secondary windings comprising portions of different lengths in different phases, and means mounting such zig-zag windings in such geometrical relation to each other with respect to their lengths as to make the commutation reactances in the different secondary windings practically equal, and at the same time the voltage measured between each outer winding terminal and the neutral point practically equal to zero when equal alternating current voltages are impressed between the most adjacent pairs of terminals and when the three terminals of the primary winding are short-circuited.

2. A converter as claimed in claim 1, in which the terminals of one of said secondary windings are in advance of the primary phases and the terminals of the other two secondary windings are behind the primary phases.

3. A converter as claimed in claim 1, in which the windings are arranged on a core having legs, and the winding parts of said secondary windings for each core leg comprising two long, two medium, and two short secondary windings.

4. A current converter transformer according to claim 1, having a main and at least one auxiliary transformer, the smallest components of the different secondary windings being mounted on such auxiliary transformers with separate primary windings separated from the main transformer.

5. A current converter transformer according to claim 4, in which the separate auxiliary transformers are provided with additional series reactors for adjusting the total reactances.

ERICH UHLMANN.

REFERENCES CITED

The following references are of record in the file of this patent:

UNITED STATES PATENTS

| Number | Name | Date |
|---|---|---|
| 1,712,505 | Kubler | May 14, 1929 |
| 1,783,804 | Lennox | Dec. 2, 1930 |
| 1,876,428 | Lennox | Sept. 6, 1932 |
| 1,895,370 | Boyajian | Jan. 24, 1933 |
| 2,009,166 | DeBlieux | July 23, 1935 |
| 2,022,341 | Meyer-Delius | Nov. 26, 1935 |
| 2,307,527 | Maslin et al. | Jan. 5, 1943 |

FOREIGN PATENTS

| Number | Country | Date |
|---|---|---|
| 322,107 | Great Britain | Nov. 28, 1927 |